US011128788B2

(12) United States Patent
Wade

(10) Patent No.: US 11,128,788 B2
(45) Date of Patent: Sep. 21, 2021

(54) IMAGE SENSOR DRIVING DEVICE, CAMERA DEVICE AND ELECTRONIC DEVICE BOTH HAVING SUCH DRIVING DEVICE MOUNTED THEREIN

(71) Applicant: New Shicoh Motor Co., Ltd., Zhejiang (CN)

(72) Inventor: Tatsuki Wade, Yamato (JP)

(73) Assignee: NEW SHICOH MOTOR CO., LTD., Zhejiang (CN)

( * ) Notice: Subject to any disclaimer, the term of this patent is extended or adjusted under 35 U.S.C. 154(b) by 103 days.

(21) Appl. No.: 16/598,209

(22) Filed: Oct. 10, 2019

(65) Prior Publication Data

US 2020/0120242 A1 Apr. 16, 2020

(30) Foreign Application Priority Data

Oct. 12, 2018 (JP) .............................. JP2018-193237

(51) Int. Cl.
| | |
|---|---|
| *H04N 5/225* | (2006.01) |
| *G02B 7/02* | (2021.01) |
| *G02B 27/64* | (2006.01) |
| *H04N 5/232* | (2006.01) |
| *G03B 3/10* | (2021.01) |

(52) U.S. Cl.
CPC ........... *H04N 5/2253* (2013.01); *G02B 7/023* (2013.01); *G02B 27/64* (2013.01); *G03B 3/10* (2013.01); *H04N 5/232* (2013.01); *H04N 5/2252* (2013.01); *H04N 5/2254* (2013.01)

(58) Field of Classification Search
CPC .................................................... H04N 5/2253
See application file for complete search history.

(56) References Cited

U.S. PATENT DOCUMENTS

| | | | |
|---|---|---|---|
| 7,881,598 B1 * | 2/2011 | Wu .......................... | G03B 3/10 |
| | | | 396/55 |
| 8,040,620 B2 * | 10/2011 | Wade ....................... | G02B 7/08 |
| | | | 359/824 |
| 2013/0215511 A1 * | 8/2013 | Wu ..................... | H04N 5/23287 |
| | | | 359/554 |

(Continued)

FOREIGN PATENT DOCUMENTS

JP 2004274242 A 9/2004

*Primary Examiner* — Cynthia Segura
(74) *Attorney, Agent, or Firm* — Buchanan Ingersoll & Rooney PC

(57) ABSTRACT

An image sensor driving device includes a fixing portion, an image sensor assembly that is moved with respect to the fixing portion, a driving mechanism and a support mechanism. The image sensor assembly includes an image sensor of the rectangular form. The direction of the normal to the light receiving surface of the image sensor is a first axial direction and the directions perpendicular to the first axial direction and each other are a second axial direction and a third axial direction, respectively. The driving mechanism includes a coil portion for driving the image sensor assembly in the second axial direction or in the third axial direction with respect to the fixing portion and a magnet portion provided for facing opposite the coil portion, the coil portion being disposed on one and the magnet portion being disposed on the other of the image sensor assembly and the fixing portion.

18 Claims, 8 Drawing Sheets

(56) References Cited

U.S. PATENT DOCUMENTS

| | | | | |
|---|---|---|---|---|
| 2013/0314792 A1* | 11/2013 | Hu | ................... | H02K 41/0356 |
| | | | | 359/557 |
| 2015/0365568 A1* | 12/2015 | Topliss | ............... | H02K 41/0356 |
| | | | | 348/360 |
| 2017/0289457 A1* | 10/2017 | Hu | ....................... | G02B 27/646 |
| 2019/0141248 A1* | 5/2019 | Hubert | ............... | H04N 5/23287 |
| 2020/0192191 A1* | 6/2020 | Wade | ................... | G02B 27/646 |

* cited by examiner (a)

(b)

(a)

(b)

(a)

(b)

(a)

(b)

(a)

(b)

(a)

(b)

IMAGE SENSOR DRIVING DEVICE, CAMERA DEVICE AND ELECTRONIC DEVICE BOTH HAVING SUCH DRIVING DEVICE MOUNTED THEREIN

CROSS-REFERENCE TO RELATED APPLICATION

This application claims priority to Japanese Patent Application No. 2018-193237 filed Oct. 12, 2018, the disclosure of which is hereby incorporated in its entirety by reference.

FIELD OF THE INVENTION

The present invention relates to an image sensor driving device for use with the electronic device such as the smartphone and any other similar device. Also, the present invention relates to a camera device and an electronic device both of which have the image sensor driving device mounted therein.

BACKGROUND

As the system for preventing or correcting any image blurring effects caused by shaking the camera, it is known that there is the sensor-shifting system in which the image sensor can be moved in the direction perpendicular to the incident light. The lens is not moved in this sensor-shifting system.

One of the example of the before described sensor-shifting system is disclosed in JP 2004-274242A. JP 2004-274242A discloses the structure in which the first stage on which the image sensor is moved in the X axial direction with respect to the base plate and the second stage on which it is moved in the Y axial direction are overlapped one over the other in the Z axial direction. The structure is such that the base plate is fixed to the camera case and the image sensor is fixed to the second stage. The first stage and the second stage are driven by the actuator using the piezoelectric element and the driving axis.

SUMMARY OF THE INVENTION

The structure disclosed in JP 2004-274242A is the structure that is used with the usual digital camera which has the great thickness in the Z direction. So that the structure disclosed in JP 2004-274242A is difficult to apply to the camera device which is mounted on any thin electronic device such as the smartphone and any other similar device.

The present invention is intending to solve the problems described above. It is therefore an object of the present invention to provide a thin image sensor driving device having the structure based on the sensor shifting system and which can be mounted on any thin electronic device such as the smartphone and any other similar device, and to provide a camera device and an electronic device on both of which said thin image sensor driving device is mounted.

In view of the foregoing, a first aspect of image sensor driving device of the present invention comprises:
a fixing portion;
an image sensor assembly capable of being moved with respect to said fixing portion;
a driving mechanism; and
a support mechanism, wherein
said image sensor assembly includes an image sensor of the rectangular form, the direction of the normal to the light receiving surface of said image sensor being assumed to be a first axial direction and the direction perpendicular to the first axial direction and the direction in which the those two directions are perpendicular to each other being assumed to be a second axial direction and a third axial direction, respectively;
said driving mechanism includes a coil portion and a magnet portion facing opposite said coil portion, said coil portion driving said image sensor assembly to be moved in said second axial direction or in said third axial direction with respect to said fixing portion;
said coil portion being disposed on one of said image sensor assembly and said fixing portion;
said magnet portion being disposed on the other one of said image sensor assembly and said fixing portion; and said support mechanism is provided for supporting said image sensor assembly so that it can be moved with respect to said fixing portion.

According to the present invention, a thin image sensor driving device having the structure based on the sensor shifting system and which can be mounted on any thin electronic device such as the smartphone and any other similar device is provided. And, a camera device and an electronic device on both of which said thin image sensor driving device is mounted are provided.

BEST MODE OF EMBODYING THE INVENTION

Figure 1:
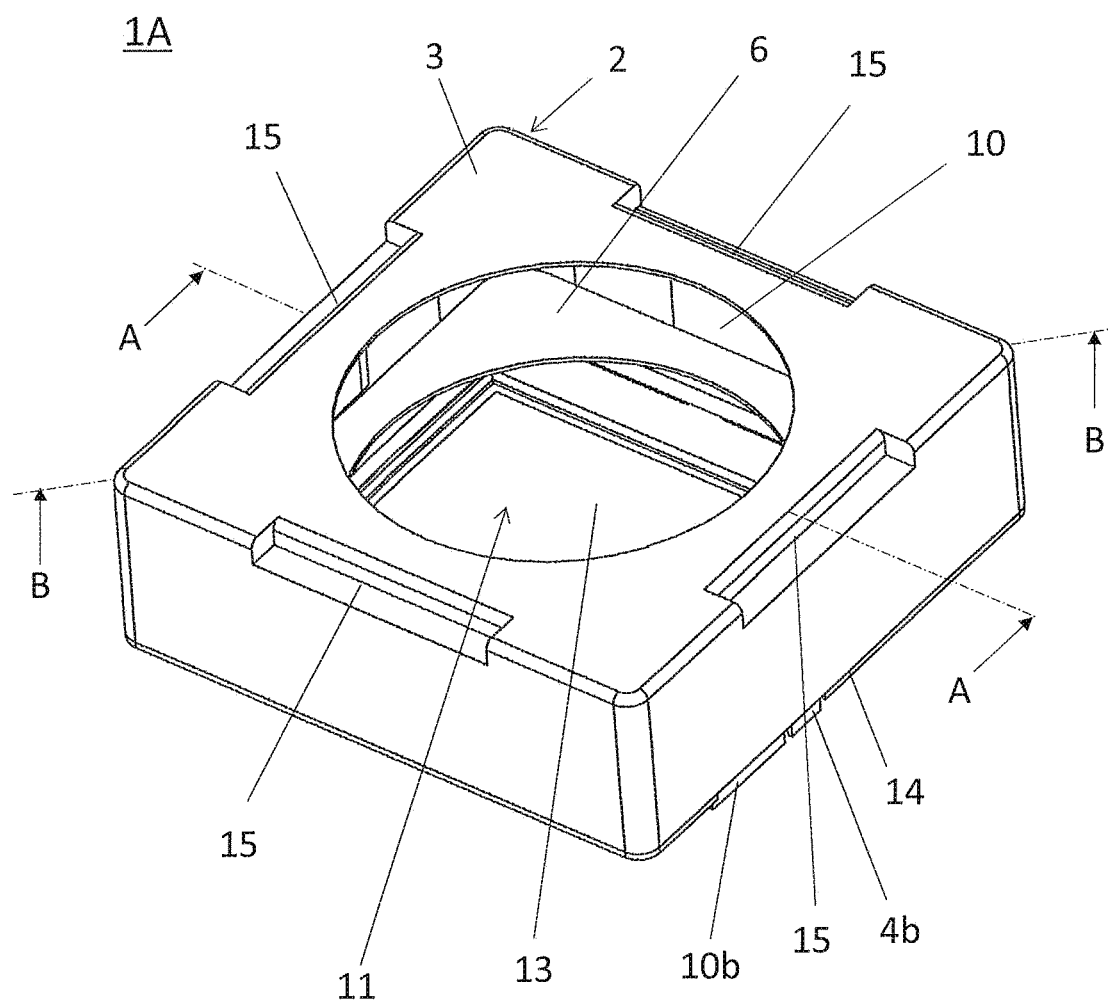
FIG. 1 is a perspective view illustrating one example of the first embodiment of the present invention.

The following description presents examples of the embodiments of the present invention by referring to the respective accompanying drawings.

First Embodiment

The first embodiment is now described by referring to FIGS. 1 through 4. Generally, the image sensor driving device 1A in accordance with the first embodiment includes a fixing portion, an image sensor assembly, a driving mechanism and a support mechanism. Specifically, the image sensor driving device 1A is structured such that it includes the individual parts or elements such as a body portion 3, a terminal 4, a spring 5, a magnet fixing plate 6, a magnet portion 7, a coil portion 8, wire members 9, a circuit substrate 10, a image sensor assembly 11 and a bottom plate 14.

The image sensor assembly 11 is structured such that it includes an image sensor 13 that has the light receiving surface and is mounted on a substrate 12.

Figure 2:
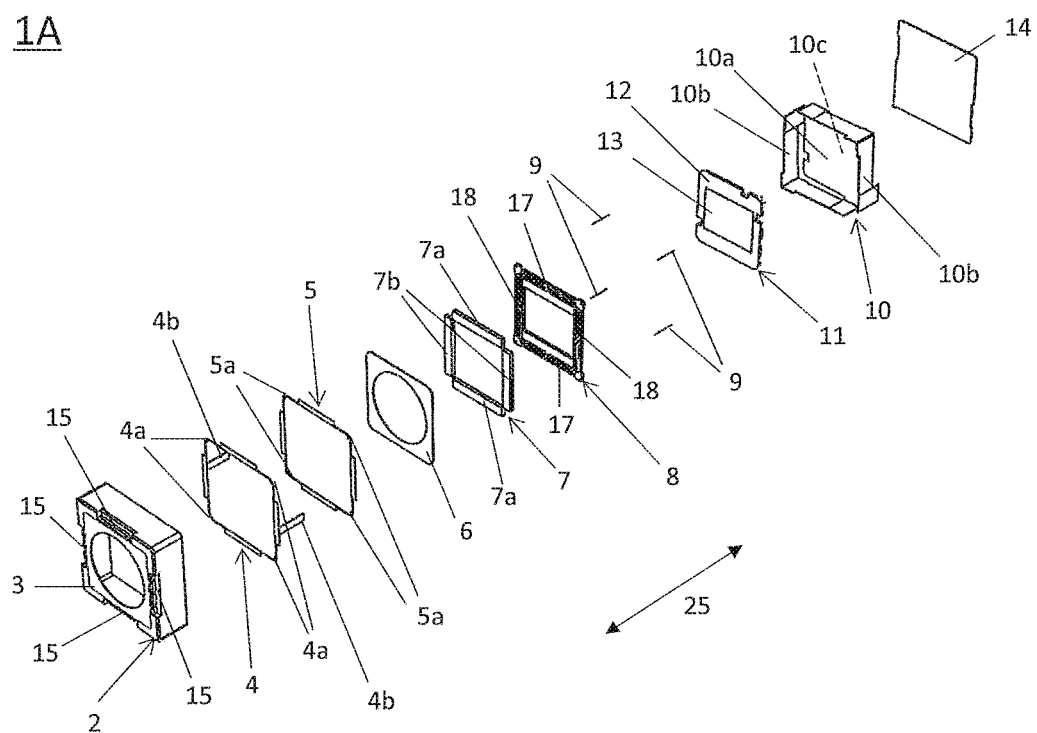
FIG. 2 is an exploded perspective view of the image sensor driving device illustrated in FIG. 1.
Figure 4:
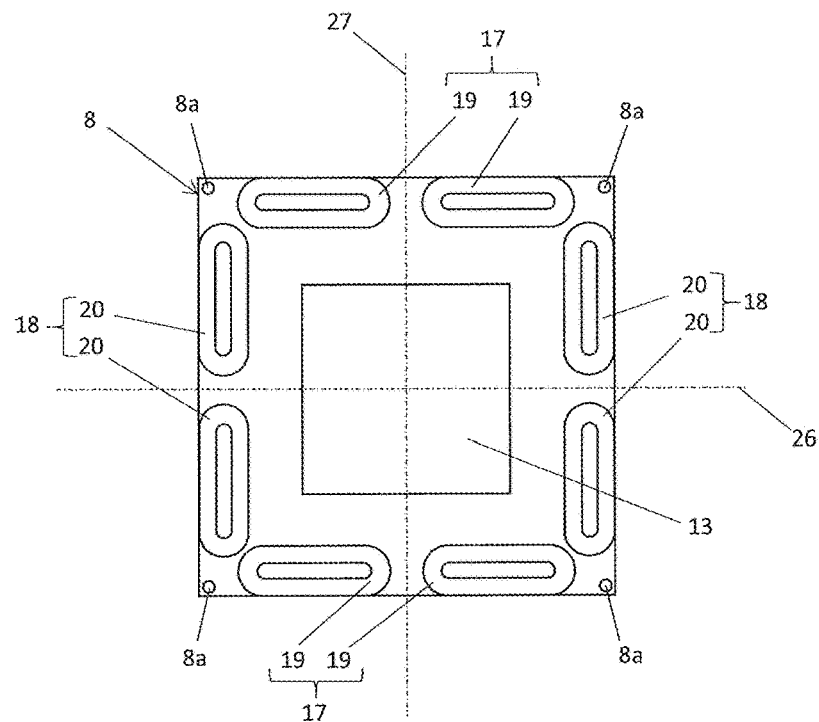
FIG. 4(*a*) is a plan view illustrating one example of the location of a coil mounted in the image sensor driving device in accordance with the first embodiment and (b) illustrates another example of the locations of the coil.
Figure 4:
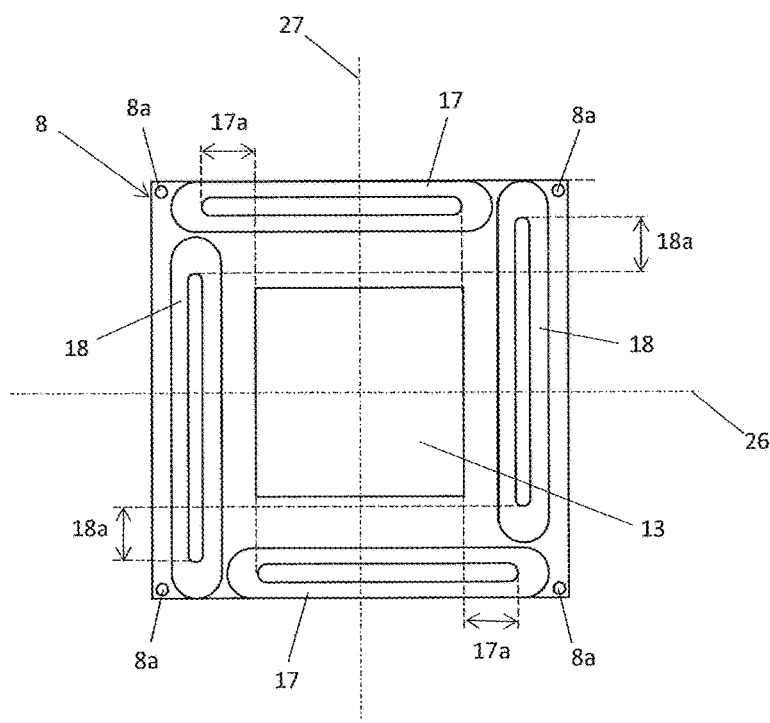

In the first embodiment through the fourth embodiment, the direction of the normal to the light receiving surface of the image sensor 13 is assumed to be the first axial direction 25 as shown in FIG. 2, and the direction perpendicular to the first axial direction 25 and the direction in which those two directions are perpendicular to each other are assumed to be the second axial direction 26 and the third axial direction 27, respectively, as shown in FIG. 4. The side through which the incident light is entered in the first axial direction 25 (the left lower side in FIG. 2) is also assumed to be the front side and the side on which the image is formed (the right upper side in FIG. 2) is also assumed to be the rear side.

The light receiving surface of the image sensor 13 is a plane surface that expands in the second axial direction 26 and in the third axial direction 27.

The fixing portion is structured such that it includes a casing 2 to be fixed securely inside the camera device. The casing 2 includes a body portion 3 having the rectangular box-like form as it is viewed from the first axial direction 25 and a bottom plate 14 having the rectangular plate-like form as it is viewed from the first axial direction 25. In the first embodiment, the body portion 3 and the bottom plate 14 are both formed of any magnetic substance, although they may be formed of any non-magnetic substance. The image sensor assembly 11 is housed in the space formed by fixing the rear end of the outer peripheral wall of the body portion 3 to the outer side edge of the bottom plate 14. The body portion 3 has a through hole at the center of the front side wall thereof through which the light is passed toward the image sensor 13. The body portion 3 has four side walls, each of which has a step 15 on the upper side thereof.

Figure 3:
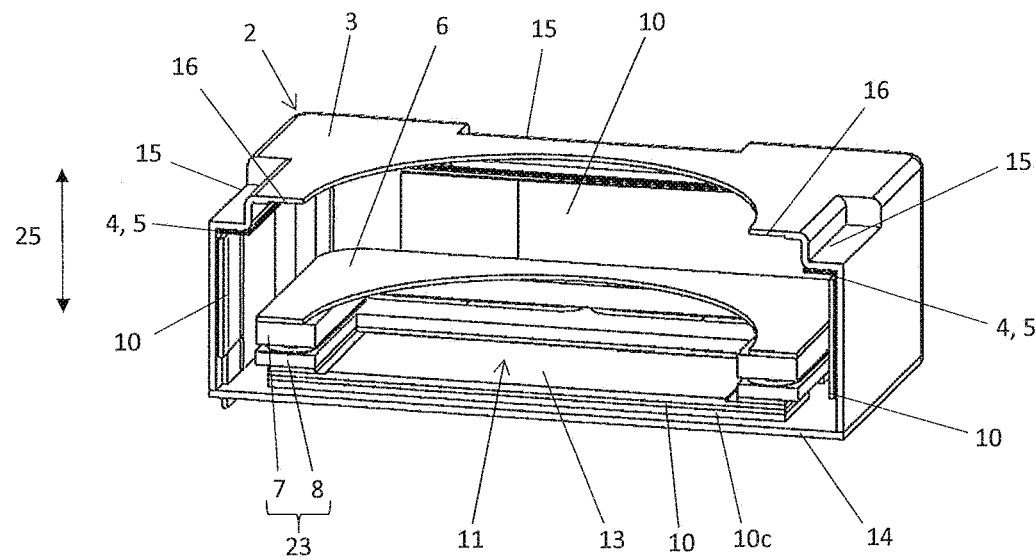
FIG. 3(*a*) is a cross sectional view along the line A-A of the image sensor driving device illustrated in FIGS. 1 and (*b*) is a cross sectional view along the line B-B of the image sensor driving device illustrated in FIG. 1.
Figure 3:
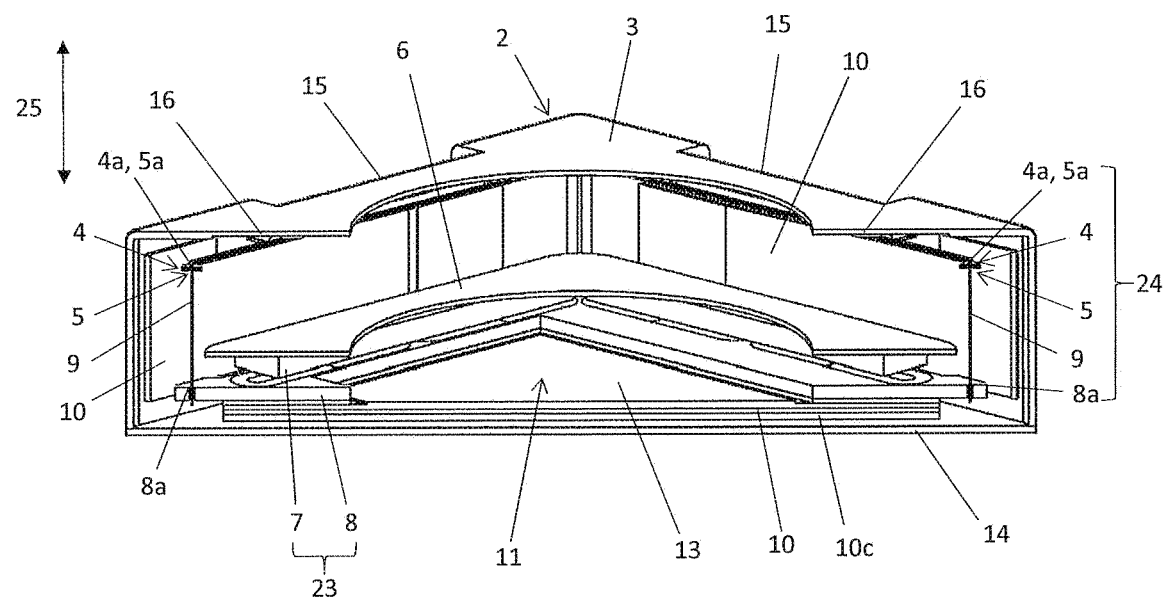

As shown in FIG. 3, the spring 5 which is made of any metal and the terminal 4 which is made on FPC (Flexible Printed Circuit) are mounted on the rear side surface of the step 15 in the first axial direction 25. The electric power is supplied to the coil portion 8 to be described later through the terminal 4.

The spring 5 is formed like the thin plate having the rectangular form that appears to be annular as it is viewed from the first axial direction 25, each of the four sides has a widened portion at the center thereof, and each of the four corners has a fixing hole 5a for securing the wire member 9.

Like the spring 5, the terminal 4 is also formed like the thin plate having the rectangular form that appears to be annular as it is viewed from the first axial direction 25, each of the four sides has a widened portion at the center thereof, and each of the four corners has the fixing portion that serves as the fixing hole 4a for securing the wire member 9. Furthermore, the coil connecting portion 4b extends from the widened portion of one of the two sides facing opposite each other toward the backward of the first axial direction 25, and as shown in FIG. 1, the coil connecting portion 4b is exposed outwardly from the rear end of the side wall of the body portion 3.

The widened portion of the spring 5 is fixed to the rear side of the step 15 on the body portion 3 through the widened portion of the terminal 4. Accordingly, the spring 5 and the terminal 4 except for the respective widened portions are held in the air floating state, allowing the wire member 9 to be supported elastically by the spring 5.

A thinned portion 16 is formed around the earlier mentioned through hole on the rear side of the front side wall of the body portion 3 as shown in FIG. 3. Although this is not shown, a lens driving device (not shown) for moving the lens on the camera device in the first axial direction 25 is fixed to the thinned portion 16. In this way, the magnet fixing plate 6 is secured to the rear end side of the lens driving device. In the first embodiment, therefore, it is described that the magnet fixing portion 6 is included in the fixing portion since its position and attitude are not changed with respect to the casing 2.

The circuit substrate 10 has the FPC structure, and has a plane plate 10a and a side plate 10b as shown in FIG. 2. In the first embodiment, the side plate 10b is provided for rising from each of the two sides of the plane plate 10a facing opposite each other toward the front side of the first axial direction 25 and extending in the second axial direction 26 and in the third axial direction 27. The end portion of each side plate 10b is fixed to the inner side of the side wall of the body portion 3 and is exposed outwardly as shown in FIG. 1. The image sensor assembly 11 is fixed to the front side of the plane plate 10a and conducts electricity through each side plate 10b. As shown in FIG. 3, a metal plate 10c is fixed to the rear side of the plane plate 10a. The metal plate 10c is provided for escaping the heat from the circuit substrate 10.

The driving mechanism 23 includes the coil portion 8 and the magnet portion 7 facing opposite the coil portion 8 and produces the driving force for moving the image sensor assembly 11 toward the second axial direction 26 or toward the third axial direction 27 with respect to the casing 2.

The coil portion 8 includes first coils 17 for producing a driving force in the third axial direction 27 and second coils 18 for producing a driving force in the second axial direction 26.

In the first embodiment, the coil portion 8 has the rectangular plate-like form that appears to be annular as it is viewed from the first axial direction 25 and is fixed to the front side of the substrate 12 which surrounds the image sensor 13. The coil portion 8 includes one set of first coils 17, 17 and one set of second coils 18, 18, both of which are so arranged as to hold the image sensor 13 therebetween. More specifically, as shown in FIG. 4(a), each of the first coils 17 and each of the second coils 18 are arranged alternately at an interval of 90 degrees with the center of the image sensor 13 being assumed to be the center.

As shown in FIG. 4(a), each of the first coils 17 includes the portion of two straight lines which extend straightly in the second axial direction 26 with the first axial direction 25 being assumed to be the coiling axial direction and the portion of two semi-circles which link together the ends of two-straight line portion. Similarly, each of the second coils 18 includes the portion of two straight lines which extend straightly in the third axial direction 27 with the first axial direction 25 being assumed to be the coiling axial direction and the portion of two semi-circles which link together the ends of two-straight line portion. It is also noted that each of the first coils 17 is disposed along the third axial direction 27 and each of the second coils 18 is disposed along the second axial direction 26. In the first embodiment, it is also noted that each of the first coils 17 and each of the second coils 18 are provided to face opposite each other and with the image sensor 13 therebetween.

In the first embodiment, as shown in FIG. 4(*a*), each of the first coils 17 includes two first smaller coils 19, 19 and each of the second coils 18 includes two second smaller coils 20, 20. Each of the first smaller coils 19 includes the portion of two straight lines which extend straightly in the second axial direction 26 with the first axial direction 25 being assumed to be the coiling axial direction and the portion of two semi-circles which link together the ends of two-straight line portion. Similarly, each of the second smaller coils 20 includes the portion of two straight lines which extend straightly in the third axial direction 27 with the first axial direction 25 being assumed to be the coiling axial direction and the portion of two semi-circles which link together the ends of two-straight line portion. The first smaller coils 19, 19 in each of the first coils 17 is disposed along the second axial direction 26 so that the two-straight lines can align each other. Similarly, the second smaller coils 20, 20 in each of the second coils 18 are disposed along the third axial direction 27 so that the two-straight lines can align each other. The first smaller coils 19, 19 in one first coil 17 are provided to face opposite the corresponding first smaller coils 19, 19 in the other first coil 17 with the image sensor 13 therebetween. The second smaller coils 20, 20 in one second coil 18 are provided to face opposite the corresponding second smaller coils 20, 20 in the other second coil 18 with the image sensor 13 therebetween.

Each of the four corners in the coil portion 8 has a fixing hole 8*a* for securing the wire member 9 as shown in FIG. 4(*a*). This fixing hole 8*a* is disposed outside the image sensor assembly 11.

The magnet portion 7 includes a first magnet 7*a* facing opposite each of the first coils 17 and a second magnet 7*b* facing opposite each of the second coils 18. In the first embodiment, the magnet portion 7 includes one set of first magnets 7*a*, 7*a* and one set of second magnets 7*b*, 7*b*, each of the sets having the rectangular rod-like form as it is viewed from the first axial direction 25, and is secured to the rear side of the magnet fixing plate 6. The first magnet 7*a* is provided for facing opposite the first coil 17 in the first axial direction 25. The second magnet 7*b* is provided for facing opposite the second coil 18 in the first axial direction 25. As noted, each of the first magnets 7*a* and each of the second magnets 7*b* are arranged alternately at an interval of 90 degrees with the center of the image sensor 13 being assumed to be the center.

Each of the first magnets 7*a* and each of the second magnets 7*b* are magnetized so that the magnetic polarities on the side facing opposite the two straight line portions of each of the first coils 17 and each of the second coils 18 can be magnetized into the mutually different magnetic polarities. Specifically, the magnetized side of the first magnet 7*a* is magnetized into the mutually different magnetic polarities in the third axial direction 27, and the magnetized side of the second magnet 7*b* is also magnetized into the mutually different magnetic polarities in the second axial direction 26.

As electric current flows through the first coil 17, an electromagnetic force in the third axial direction 27 is produced. This electromagnetic force produces the driving force for moving the image sensor assembly 11 in the third axial direction 27. As electric current flows through the second coil 18, an electromagnetic force in the second axial direction 26 is produced. This electromagnetic force will produce the driving force for moving the image sensor assembly 11 in the second axial direction 26.

As electric current of the opposite direction flows through the first smaller coils 19, 19 adjacent to each other in the same first coil 17, the electromagnetic force of the mutually opposed direction will be produced in the third axial direction 27. When electric current of the opposite direction flows through the second smaller coils 20, 20 adjacent to each other in the same second coil 18, the electromagnetic force of the mutually opposed direction will be produced in the second axial direction 26. Thus, this will produce the driving force for rotating the image sensor assembly 11 around the first axial direction 25 with the center of the image sensor 13 being used as the turning axis.

Each of the first magnets 7*a* and each of the second magnets 7*b* may be made of a plurality of smaller magnets corresponding to the first smaller coil 19 and the second smaller coil 20, respectively. In this case, the first magnet 7*a* may include two first smaller magnets facing opposite the corresponding first smaller coils 19, 19. Each of the first smaller magnets is disposed along the second axial direction 26. Also, the second magnet 7*b* may include two second smaller magnets facing opposite the corresponding first smaller coils 20, 20. Each of the second smaller magnets is disposed along the third axial direction 26.

The support mechanism 24 is provided for supporting the image sensor assembly 11 so that it can be moved with respect to the casing 2. In the first embodiment, it is shown in FIG. 2, the support mechanism 24 includes four wire members 9 extending in the first axial direction 25. As shown in FIG. 3(*b*), each of the four wire members 9 has an end on its front side in the first axial direction 25 that is fitted into the fixing hole 4*a* provided on each of the four corners of the terminal 4 and into the fixing hole 5*a* provided on each of the four corners of the spring 5. At this moment, the wire member 9 will be connected electrically to the terminal 4, but will not be connected electrically to the spring 5. Each of the wire member 9 has an end on its rear side in the first axial direction 25 which is fitted securely into the fixing hole 8*a* on the coil portion 8. Thus, the wire member 9 is connected electrically to the coil portion 8. In this way, each of the coil connecting portions 4*b* on the terminal 4 is connected electrically to the coil portion 8. Then, electric power is supplied to the coil portion 8 through the terminal 4 and each of wire members 9. This allows each of the wire members 9 to link the casing 2 with the image sensor assembly 11. Thus, the image sensor assembly 11 can be supported so that it can be moved in the second axial direction 26, in the third axial direction 27 or in the rotating direction around the first axial direction 25 with respect to the casing 2.

In the first embodiment and as described above, each wire member 9 links the casing 2 with the image sensor assembly 11 so that the image sensor assembly 11 can be moved in the second axial direction 26, in the third axial direction 27 or in the rotating direction around the first axial direction 25 with respect to the casing 2. The driving mechanism 23 includes the first coil 17 including the first smaller coils 19, the second coil 18 including the second smaller 20, the first magnet 7*a* facing opposite each first coil 17 and the second magnet 7*b* facing opposite each second coil 18. Therefore, the driving mechanism 23 may be made to produce the driving force for moving the image sensor assembly 11 in the second axial direction 26, in the third axial direction 27 or in the rotating direction around the first axial direction 25 with respect to the casing 2.

The driving mechanism 23 is structured such that the coil portion 8 is disposed on the image sensor assembly 11 and the magnet portion 7 is disposed on the magnet fixing plate 6 that forms part of the fixing portion. Thus, the support mechanism supports the image sensor assembly 11 so that it can be moved with respect to the fixing portion. Therefore, the image sensor driving device 1A can be built to reduce its thickness in the first axial direction 25.

It should be noted that the first coil 17 and the second coil 18 may have the structure that is different from those structures described above. They may have various structures. For example, the firs smaller coils 19 and the second smaller coils 18 may be omitted. Instead, the coil arranged on each side may be a single first coil 17 or a single second coil 18. In this case, the rotary movement around the first axial direction 25 cannot be performed, but the structure can be simplified.

As shown in FIG. 4(b), the structure may be such that one set of first coils 17, 17 facing opposite each other are displaced from each other in the second axial direction 26 and one set of second coils 18, 18 facing opposite each other are displaced from each other in the third axial direction 27. In this case, when electric current flows through each of the first coils 17 so that the electromagnetic force in the same direction of the third axial direction 27 can be produced, the image sensor assembly 11 will be moved toward this direction of the third axial direction 27. Similarly, when electric current flows through each of the second coils 18 so that the electromagnetic force in the same direction of the second axial direction 26 can be produced, the image sensor assembly 11 will be moved toward this direction of the second axial direction 26. Reversely, when electric current flows through each of the first coils 17 so that the electromagnetic force in the opposed direction of the third axial direction 27 can be produced, the electromagnetic forces of the third axial direction 27 that are produced at the two straight line portion common to each of the first coils 17 in the second axial direction 26 will cancel each other, but the electromagnetic forces that are produced at the straight line portions 17a, 17a of each of the first coils 17 that are displaced from each other in the second axial direction 26 will not cancel each other, acting as the rotational force around the first axial direction 25. This is the same as for the second coils 18. That is, the electromagnetic forces that are produced at the two straight line portions 18a, 18a of each of the second coils 18 that are displaced from each other in the third axial direction 27 will not cancel each other, acting as the rotational force around the first axial direction 25. This allows the image sensor assembly 11 to be moved to the rotational direction around the first axial direction 25.

In the first embodiment, the magnet portion 7 is fixed to the magnet fixing portion 6. This embodiment is not limited to the before described. For example, the magnet fixing portion 6 may be omitted. Instead, the magnet portion 7 may be fixed to the bottom on the rear side of the earlier mentioned lens driving device. Also, in the case in which the lens driving device is driven by the combination of the driving magnet and the driving coil, the driving magnet may be provided for acting as the magnet portion 7.

The magnet portion 7 may be disposed on the image sensor assembly 11, and the coil portion 8 may be disposed on the coil fixing plate but not on the magnet fixing portion 6.

The electric power is supplied to the coil portion 8 through the combination of the terminal 4 and the wire member 9, but this may occur through the circuit substrate 10 and the image sensor assembly 11.

Figure 5:
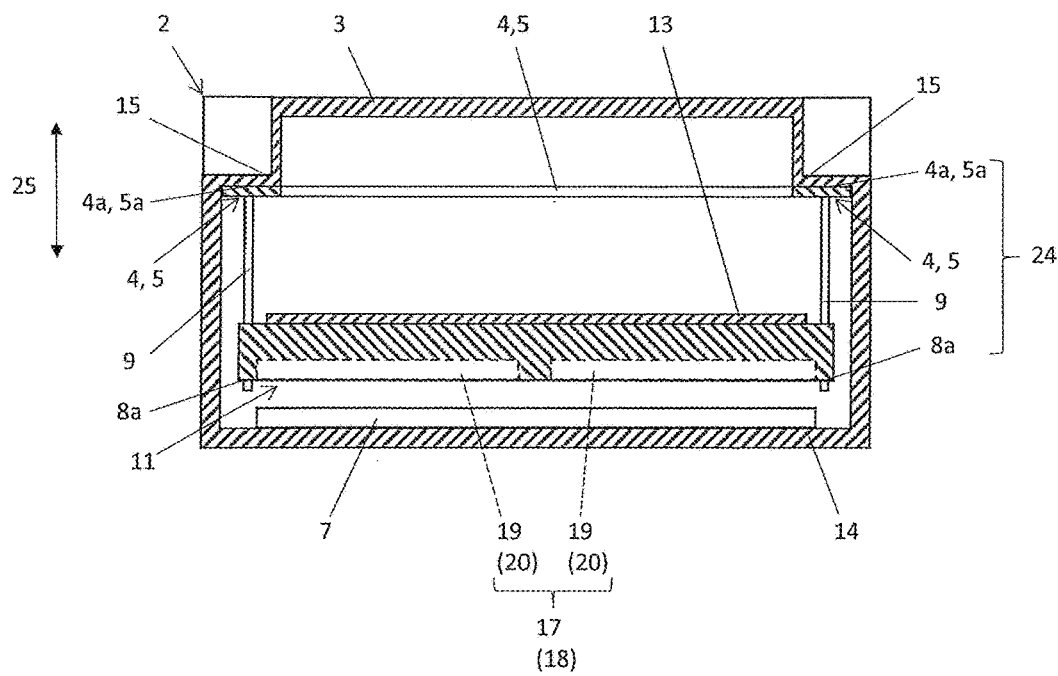
FIG. 5 illustrates one example of the second embodiment of the present invention in which (a) is a cross section of the same although some parts of the structure are omitted and (b) is a plan view illustrating one example of the location of the coil.
Figure 5:
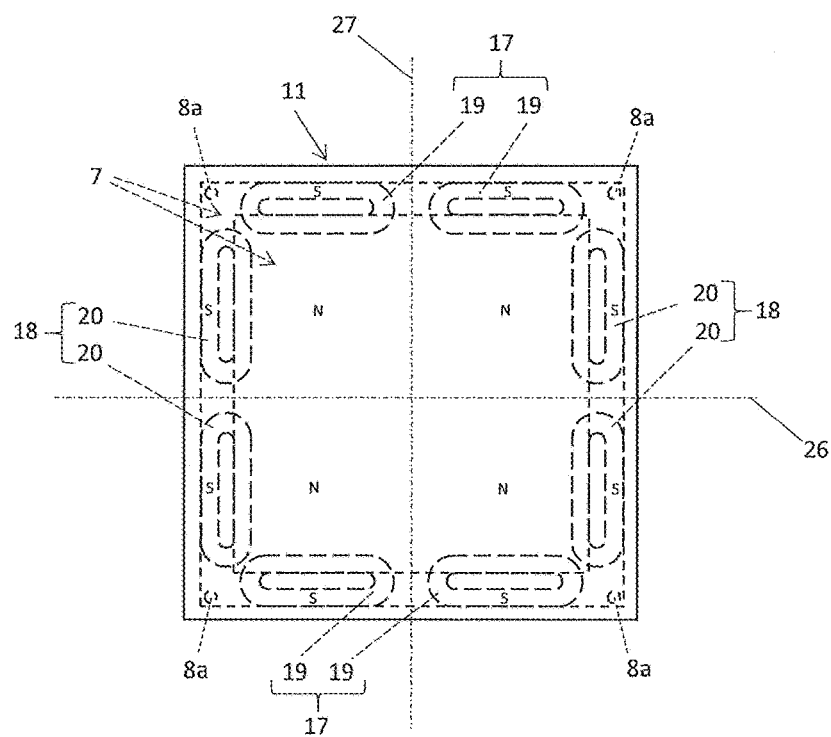
Figure 6:
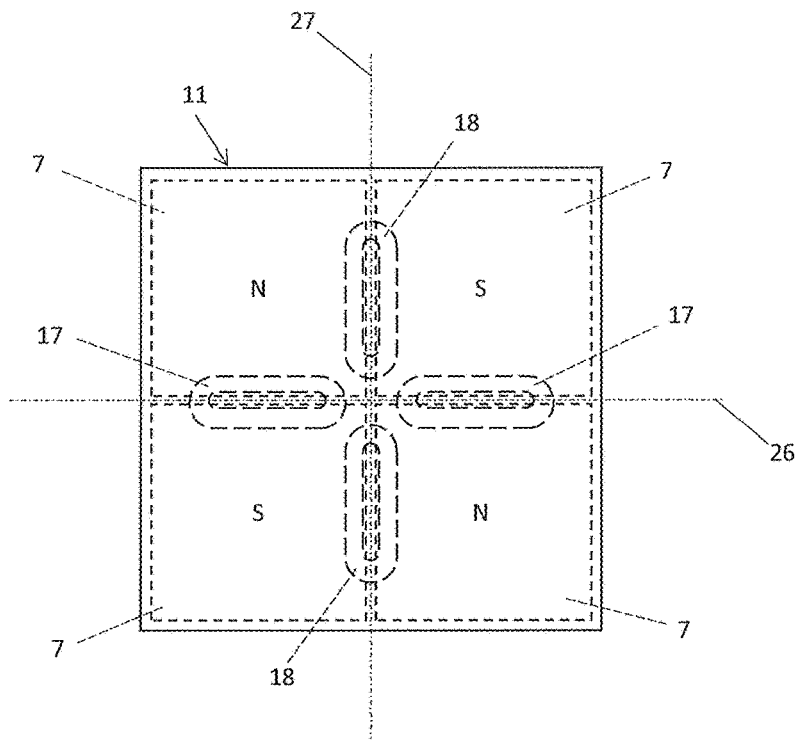
FIG. 6 illustrates another example of the second embodiment of the present invention in which (a) is a plan view illustrating another example of the location of the coil and (b) is a plan view illustrating a variation of the location of the coil illustrated in FIG. 6(*a*)
Figure 6:
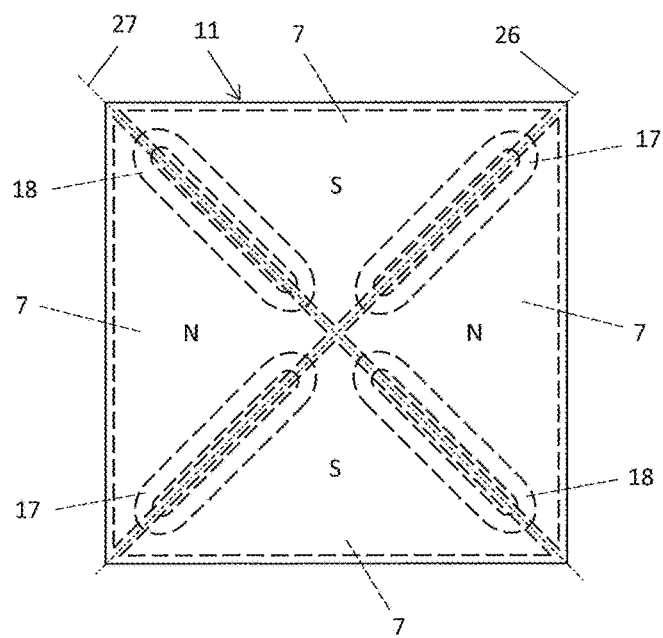

(Second Embodiment) The second embodiment is now described by referring to FIG. 5 and FIG. 6. The image sensor driving device 1B in the second embodiment differs from the image sensor driving device 1A of the first embodiment in that the coil portion 8 and the magnet portion 7 are located differently from those in the first embodiment. Except for the location of those portions that has thus been changed, the structure is the same as that in the first embodiment, and is not described any further.

The image sensor driving device 1B is structured such that the coil portion 8 is disposed on the side directed toward the rear side of the image sensor assembly 11 and the magnet portion 7 is disposed on the side directed toward the front side of the bottom plate 14 of the casing 2. In the example shown in FIG. 5, the two first smaller coils 19, 19 in each of the first coils 17 and the two second smaller coils 20, 20 in each of the second coils 18 are disposed on the rear side of the image sensor assembly 11. The magnet portion 7 is disposed on the front side of the bottom plate 14. For this reason, the magnet fixing plate 6 is not used. Alternatively, the coil portion 8 may be located inside the casing 2 and the magnet portion 7 may be disposed on the image sensor assembly 11.

The magnet portion 7 may be structured such that it includes the two first magnets 7a, 7a and the two second magnet 7b, 7b like those described in the first embodiment. The magnetized side of the magnet portion 7 may be provided such that as shown in FIG. 5(b), its inside part is magnetized into the single magnetic polarity (such as N pole) and is so disposed as to face opposite the inside part of the first coil 17 and the inside part of the second coil 18, and its outside part is magnetized into the another single magnetic polarity (such as S pole) and is so disposed as to face opposite the outside part of the first coil 17 and the outside part of the second coil 18.

In the second embodiment like the preceding embodiment, each of the wire members 9 is also provided for linking the casing 2 with the image sensor assembly 11, and the image sensor assembly 11 is supported so that it can be moved in the second axial direction 26, in the third axial direction 27 or in the rotating direction around the first axial direction 25 with respect to the casing 2. It is also seen that the driving mechanism 23 is structured such that the coil portion 8 is disposed on one of the image sensor assembly 11 and the casing 2, and the magnet portion 7 is disposed on the other one of the image sensor assembly 11 and the casing 2. For this reason, the thickness of the first axial direction 25 can be reduced.

In the second embodiment, it should be noted that the first coil 17 and the second coil 18 may be disposed to permit them to overlap the image sensor 13 as viewed from the first axial direction 25. Thus, the size of the image sensor driving device 1B in the second axial direction 26 and in the third axial direction 27 can be reduced.

In the second embodiment, the coil portion 8 may be located as shown in FIG. 6. Specifically, the first coil 17 and the second coil 18 are arranged alternately at an interval of 90 degrees with the center of the image sensor 13 being assumed to be the center. In the magnet portion 7, one N magnetic polarity or one S magnetic polarity is provided to face opposite half of one first coil 17 and half of one second coil 18. As shown in FIG. 6(b), the first coil 17 and the second coil 18 may be located to allow the second axial direction 26 and the third axial direction 27 to be rotated by 45 degrees with respect to the image sensor 13.

Third Embodiment

Figure 7:
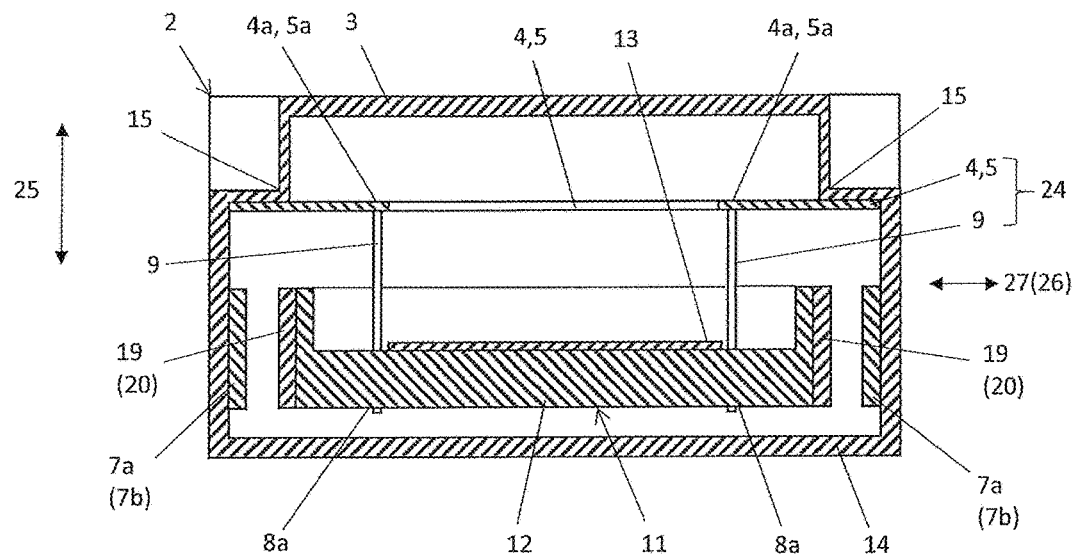
FIG. 7 illustrates one example of the third embodiment of the present invention in which (a) is a cross section of the same although some parts of the structure are omitted and (b) is a plan view illustrating one example of the location of the coil.
Figure 7:
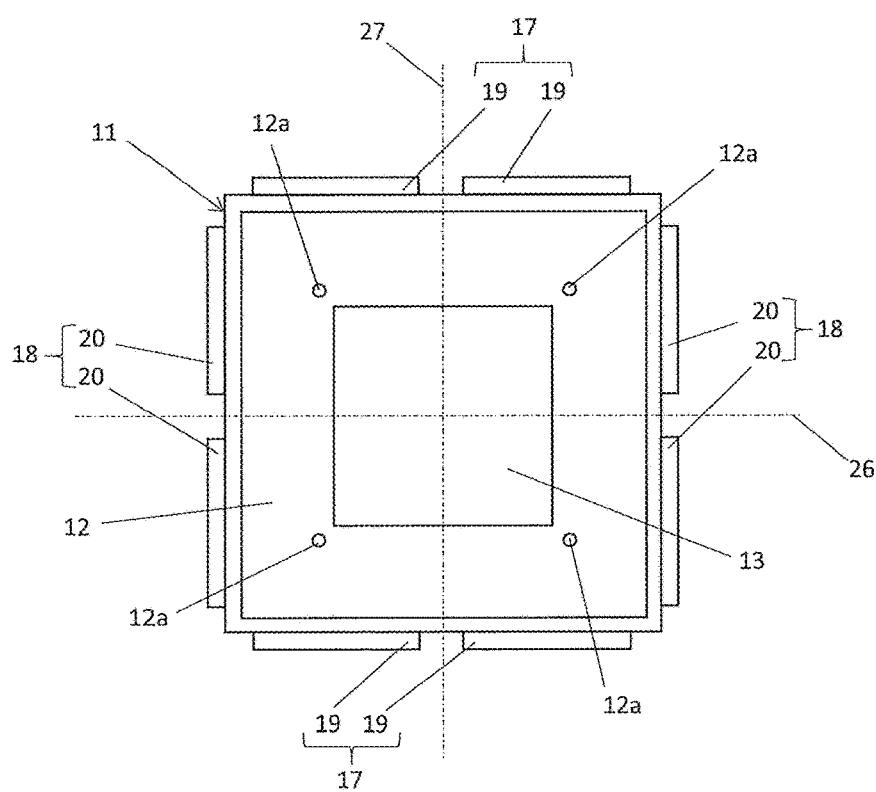

The third embodiment is now described by referring to FIG. 7. The image sensor driving device 1C in the third embodiment differs from the image sensor driving device 1A in the first embodiment in that the coil portion 8 and the magnet portion 7 are located differently from those in the first embodiment. Except for the location of those portions that has thus been changed, the structure is the same as that in the first embodiment, and is not described any further.

The image sensor driving device 1C is structured such that the coil portion 8 is located outside the image sensor assembly 11 and the magnet portion 7 is located inside the body portion 3 of the casing 2. In the example shown in FIG. 7, two first smaller coils 19, 19 in each of the first coil 17 and two second smaller coils 20, 20 in each of the second coil 18 are disposed on the outer peripheral wall of the image sensor assembly 11. Two first magnets 7a, 7a and two second magnets 7b, 7b are disposed on the inner peripheral wall of the body portion 3 of the casing 2. For this reason, the magnet fixing plate 6 is omitted. The outer peripheral wall of the image sensor assembly 11 may be provided so that it can stand up from the plate surface of the substrate 12. Alternatively, the coil portion 8 may be disposed on the casing 2 and the magnet portion 7 may be disposed on the image sensor assembly 11.

For the first coil 17, the third axial direction 27 is assumed to act as the coiling axial direction 26 and the two straight line portions extending in the second axial direction 26 are aligned with each other in the first axial direction 25. For the second coil 18, the second axial direction 26 is assumed to act as the coiling axial direction and the two straight line portions extending in the third axial direction 27 are aligned with each other in the first axial direction 25. The magnetized side of the first magnet 7a is provided to face opposite the first coil 17 in the third axial direction 27 and is totally magnetized into the single magnetic polarity. The magnetized side of the second magnet 7b is provided to face opposite the second coil 18 in the second axial direction 26 and is totally magnetized into the single magnetic polarity. As the electric current flows through the first coil 17, it produces the electromagnetic force in the third axial direction 27, urging the image sensor assembly 11 to move in the third axial direction 27. As the electric current flows through the second coil 18, it produces the electromagnetic force in the second axial direction 26, urging the image sensor assembly 11 to move in the second axial direction 26. When the electric current flows through at least one of the first smaller coils 19, 19 adjacent to each other in the same first coil 17 or through at least one of the second smaller coils 20, 20 adjacent to each other in the same second coil 18 so that it can produce the electromagnetic force in the opposed direction, it produces the driving force for causing the rotating movement around the first axial direction 25 to occur with the center of the image sensor 13 being the rotating axis.

The substrate 12 of the image sensor assembly 11 has a fixing hole 12a for securing the wire member 9, as shown in FIG. 7(b), at the position that corresponds to each of the four corners of the image sensor 13. In the third embodiment, as shown in FIG. 7(a), the end of each wire member 9 on its front side is fitted into the fixing hole 4a on the terminal 4 and into the fixing hole 5a on the spring 5. This occurs in the same way as for that in the first embodiment. It should be noted, however, that the end of each of the wire members 9 is fitted into the fixing hole 12a on the substrate 12 but not on the coil portion 8. Because of this structure, each of the wire members 9 is provided for linking the casing 2 with the image sensor assembly 11, and the image sensor assembly 11 is supported such that it can be moved toward in the second axial direction 26, in the third axial direction 27 or in the rotating direction around the first axial direction 25 with respect to the casing 2.

In the third embodiment like the preceding embodiments, each of the wire members 9 is provided for linking the casing 2 with the image sensor assembly 11, and the image sensor assembly 11 is supported such that it can be moved toward in the second axial direction 26, in the third axial direction 27 or in the rotating direction around the first axial direction 25 with respect to the casing 2. It should also be noted that the driving mechanism 23 is structured such that the coil portion 8 is located on one of the image sensor assembly 11 and the casing 2 and magnet portion 7 is located on the other one of the image sensor assembly 11 and the casing 2. For this reason, the thickness of the first axial direction 25 can be reduced. Particularly, it should be noted that because the coil portion 8 and the magnet portion 9 are not located to overlap each other in the first axial direction 25, the thickness of the first axial direction 25 can be reduced further.

Fourth Embodiment

Figure 8:
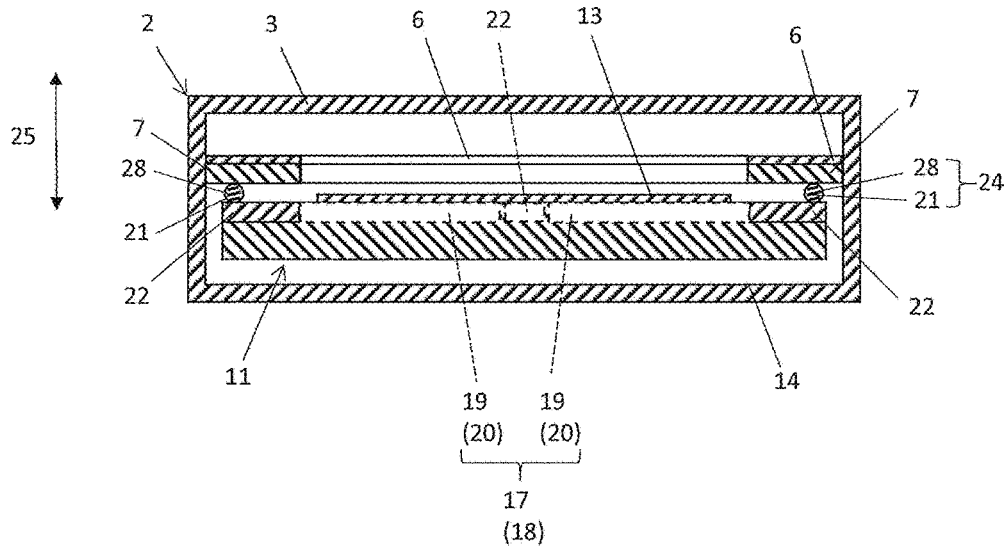
FIG. 8 illustrates one example of the fourth embodiment of the present invention in which (a) is a cross section of the same although some parts of the structure are omitted and (b) is a plan view illustrating one example of the location of the coil.
Figure 8:
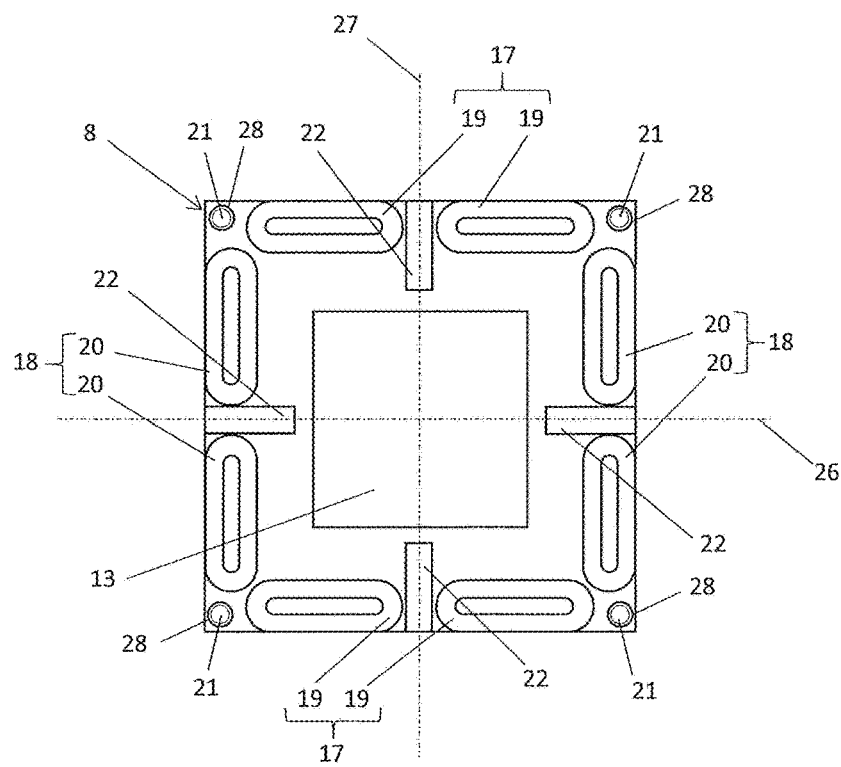

The fourth embodiment is now described by referring to FIG. 8. The image sensor driving device 1D in the fourth embodiment differs from the image sensor driving device 1A in the first embodiment in that a variation of the support mechanism 24 is provided. Except for the variation of the support mechanism 24, the structure is the same as that in the first embodiment and is not described any further.

The support mechanism 24 in the image sensor driving device 1D includes a magnetic suction mechanism 28 that is disposed between the casing 2 and the image sensor assembly 11 and the image sensor assembly 11 is supported by the combination of a spherical member 21 to be described later and the magnetic suction mechanism 28. In the example shown in FIG. 8, the spherical member 21 is provided on each of the four corners between the magnet portion 7 and the coil portion 8. Furthermore, a magnetic plate 22 is provided on each of the sides on the coil portion 8 and is magnetically attracted by the magnet portion 7. That is, the magnetic suction mechanism 28 is formed by the magnet portion 7 and the magnetic plate 22. The image sensor assembly 11 is supported by the mechanism in which the spherical member 21 is held by the magnetic suction mechanism 28. Accordingly, the spring 6 and the wire members 9 are omitted. The terminal 4 is incorporated in the circuit substrate 10. Because of this structure, the combination of the spherical member 21 and the magnetic suction mechanism 28 is provided for linking the casing 2 with the image sensor assembly 11, and the image sensor assembly 11 is supported so that it can be moved toward in the second axial direction 26, in the third axial direction 27 or in the rotating direction around the first axial direction 25 with respect to the casing 2. The driving mechanism 23 is also structured such that the coil portion 8 is located on one of the image sensor assembly 11 and the casing 2 and the magnet portion 7 is located on the other one of the image sensor assembly 11 and the casing 2. In the fourth embodiment, therefore, the thickness of the first direction 25 can be reduced.

It is noted that the magnetic plate 22 is located between the two first smaller coils 19, 19 in each of the first coil 17 and between the two second smaller coils 20, 20 in each of the second coils 18. Although the fourth embodiment is not limited to this location, the magnetic plate 22 may be disposed on the whole surface facing opposite each of the first magnets 7a and each of the second magnets 7b. The magnetic plate 22 is made of any soft magnetic substance but it may be made of any magnet. The spherical member 21 may be formed of any soft magnetic substance.

Embodiments of Camera Device and Electronic Device

The image sensor driving devices 1A through 1D that have been described above in the respective embodiments can be incorporated in the camera device or the electronic device such as the smartphone and any other similar device. As described above, each of the image sensor driving devices 1A through 1D includes the fixing portion, the image sensor assembly 11 moving with respect to the fixing portion, the driving mechanism 23 and the support mechanism 24. The image sensor assembly 11 includes the image sensor 13 of the rectangular form. The direction that is normal to the light receiving surface of the image sensor 13 is assumed to be the first axial direction 25 and the direction perpendicular to the first axial direction 25 and the direction in which those two directions are perpendicular to each other are assumed to be the second axial direction 26 and the third axial direction 27, respectively. The driving mechanism 23 includes the coil portion 8 and the magnet portion 7 provided to face opposite the coil portion 8. The coil portion 8 drives the image sensor assembly 11 to be moved toward the second axial direction 16 or the third axial direction 27 with respect to the fixing portion. The coil portion 8 is disposed on one of the image sensor assembly 11 and the fixing portion, and the magnet portion 7 is disposed on the other one of the image sensor assembly 11 and the fixing portion. The support mechanism 24 is provided for supporting the image sensor assembly 11 so that it can be moved with respect to the fixing portion.

It may be understood form the above description that each of the image sensor driving devices 1A through 1D is based on the sensor-shifting method in which any image blurring effects caused by shaking the camera can be prevented or corrected and the thickness of the first axial direction 25 can be reduced. The camera device and the electronic device such as the smartphone and any other similar device as defined in the present embodiment can prevent or correct any image blurring effects caused by shaking the camera and can become thinned since the image sensor driving device 1A through 1D based on the sensor-shifting system is incorporated in those devices.

Although the present invention has been described above with reference to several preferred embodiments thereof, it should be understood that the present invention is not limited to those embodiments and may be varied in various ways without departing from the spirit and scope of the invention as defined in the appended claims.

DESCRIPTION OF REFERENCE NUMERALS

The following is a list of the reference numerals referred to in the specification.
1A, 1B, 1C, 1D image sensor driving device
2 casing
3 body portion
4 terminal:
4a fixing hole
4b coil connecting portion
5 spring
5a fixing hole
6 magnet fixing plate
7 magnet portion
7a first magnet
7b second magnet
8 coil portion
8a fixing hole
9 wire member
10 circuit substrate
10a plane plate
10b side plate
10c metallic plate
11 image sensor assembly
12 substrate
13 image sensor
14 bottom plate
15 step
16 thinned portion
17 first coil
18 second coil
19 first small coil
20 second small coil
21 spherical member
22 magnetic plate
23 driving mechanism
24 support mechanism
25 first axial direction
26 second axial direction
27 third axial direction
28 magnetic suction mechanism

What is claimed is:

1. An image sensor driving device that comprises:
a fixing portion;
an image sensor assembly capable of being moved with respect to said fixing portion;
a driving mechanism; and
a support mechanism, wherein
said image sensor assembly includes an image sensor of a rectangular form, a direction of a normal to the light receiving surface of said image sensor being assumed to be a first axial direction and a direction perpendicular to the first axial direction and a direction in which the those two directions are perpendicular to each other being assumed to be a second axial direction and a third axial direction, respectively;
said driving mechanism includes a coil portion and a magnet portion facing said coil portion, said coil portion driving said image sensor assembly to be moved in said second axial direction or in said third axial direction with respect to said fixing portion,
said coil portion being disposed on one of said image sensor assembly and said fixing portion,
said magnet portion being disposed on the other one of said image sensor assembly and said fixing portion;
said support mechanism is provided for supporting said image sensor assembly so that it can be moved with respect to said fixing portion;
said fixing portion includes a casing configured to be fixed securely inside a camera device,
said casing includes a body portion having a rectangular box-like form having a front side wall and four side walls, each of said four side walls has a step on an upper side thereof,
a lens driving device configured to move a lens on said camera device in said first axial direction is fixed to a rear side of said front side wall,
said support mechanism includes a plurality of wire members and a spring formed like an annular thin plate having a rectangular form, centers of each of four sides of said spring are fixed to a rear side of said steps of said four side walls of said body portion, and said plurality of wire members are fixed on each of four corners of said spring and connect said body portion and said image sensor assembly, and extend in said first axial direction.

2. The image sensor driving device as defined in claim 1, wherein said coil portion includes a first coil and a second coil, wherein said first coil driving said image sensor assembly in said third axial direction with respect to said fixing portion and said second coil driving said image sensor assembly in said second axial direction with respect to said fixing portion.

3. The image sensor driving device as defined in claim 2, wherein said first coil and said second coil are arranged alternately at an interval of 90 degrees with a center of said image sensor being assumed to be the center.

4. The image sensor driving device as defined in claim 2, wherein said first coil has a two first coil construction, said two first coil construction being arranged along said third axial direction, and said second coil has a two second coil construction, said two second coil construction being arranged along said second axial direction.

5. The image sensor driving device as defined in claim 4, wherein said two first coil construction is provided such that the one first coil and the other first coil are displaced from each other in said second axial direction, and said two second coil construction is provided such that the one second coil and the other second coil are displaced from each other in said third axial direction.

6. The image sensor driving device as defined in claim 4, wherein each of said first coil construction is composed of a plurality of first smaller coils and each of said second coil construction is composed of a plurality of second smaller coils, said plurality of first smaller coils of said first coil construction being disposed along said second axial direction and said plurality of second smaller coils of said second coil construction being disposed along said third axial direction.

7. The image sensor driving device as defined in claim 2, wherein said first coil and said second coil are formed such that said first axial direction serves as a coiling axial direction, said first coil being provided to face opposite the magnetized side of said magnet portion in said first axial direction, said magnetized side facing opposite said first coil being magnetized into the mutually opposed magnetic polarities in said third axial direction, and said second coil being provided to face opposite the magnetized side of said magnet portion in said first axial direction, said magnetized side facing opposite said second coil being magnetized into the mutually opposed magnetic polarities in said second axial direction.

8. The image sensor driving device as defined in claim 7, wherein one of said coil portion and said magnet portion is disposed on one of the side facing opposite the front side and the side facing opposite the rear side of said image sensor assembly in said first axial direction.

9. The image sensor driving device as defined in claim 2, wherein said first coil is formed such that said third axial direction serves as a coiling axial direction and is provided to face opposite a magnetized side of said magnet portion in said third axial direction, said magnetized side facing opposite said first coil being magnetized into a single magnetic polarity, and said second coil is formed such that said second axial direction serves as a coiling axial direction and is provided to face opposite the magnetized side of said magnet portion in said second axial direction, said magnetized side facing opposite said second coil being magnetized into a single magnetic polarity.

10. The image sensor driving device as defined in claim 9, wherein one of said coil portion and said magnet portion is disposed on the lateral side of said image sensor assembly.

11. A camera device having the image sensor driving device as defined in claim 1 mounted therein.

12. An electronic device having the image sensor driving device as defined in claim 1 mounted therein.

13. The image sensor driving device as defined in claim 1, wherein each of the four corners of said spring are held in a floating state.

14. The image sensor driving device as defined in claim 13, wherein the centers of each four sides of said spring are formed as a widened portion, and said spring is fixed to the rear side of said steps at said widened portion.

15. The image sensor driving device as defined in claim 1, wherein the centers of each four sides of said spring are formed as a widened portion, and said spring is fixed to the rear side of said steps at said widened portion.

16. The image sensor driving device as defined in claim 1, comprising a terminal formed like an annular thin plate having a rectangular form and made on a flexible printed circuit board, wherein centers of each of four sides of said terminal are fixed to a rear side of said steps, said plurality of wire members are fixed on each of four corners of said terminal, and the electric power is supplied to said coil portion through said terminal.

17. The image sensor driving device as defined in claim 16, wherein said spring is fixed to the rear side of said step through said terminal.

18. The image sensor driving device as defined in claim 17, wherein a coil connecting portion extends from the center of one of the two sides facing each other toward the backward of the first axial direction, and said coil connecting portion is exposed outwardly from the rear end of said side wall of said body portion.

* * * * *